United States Patent [19]
Dent

[11] Patent Number: 5,832,389
[45] Date of Patent: Nov. 3, 1998

[54] WIDEBAND DIGITIZATION SYSTEMS AND METHODS FOR CELLULAR RADIOTELEPHONES

[75] Inventor: Paul W. Dent, Pittsboro, N.C.

[73] Assignee: Ericsson Inc., Research Triangle Park, N.C.

[21] Appl. No.: 627,956

[22] Filed: Apr. 3, 1996

Related U.S. Application Data

[63] Continuation-in-part of Ser. No. 217,301, Mar. 24, 1994, Pat. No. 5,548,813, and Ser. No. 439,116, May 11, 1995, Pat. No. 5,724,666.

[51] Int. Cl.$^6$ ...................................................... H04R 1/40
[52] U.S. Cl. .......................... 455/562; 455/101; 455/132; 455/272; 343/700 MS; 343/890; 370/337; 375/347
[58] Field of Search ...................................... 455/101, 102, 455/103, 132, 133, 134, 135, 272, 273, 275, 277.1, 277.2, 279.1, 422, 424, 425, 443, 500, 517, 524, 526, 562; 343/890, 893, 700 MS; 370/19, 337, 310; 375/347, 349

[56] References Cited

U.S. PATENT DOCUMENTS

| 3,956,699 | 5/1976 | Leahy | 370/203 |
|---|---|---|---|
| 4,072,956 | 2/1978 | Provencher | 343/844 |
| 4,101,836 | 7/1978 | Craig et al. | 325/302 |

(List continued on next page.)

FOREIGN PATENT DOCUMENTS

| 0 591 770 A2 | 4/1994 | European Pat. Off. . |
|---|---|---|
| 0 650 268 A1 | 4/1995 | European Pat. Off. . |
| WO 92/02996 | 2/1992 | WIPO . |

OTHER PUBLICATIONS

William C.-Y. Lee, et al., *Polarization Diversity System For Mobile Radio*, IEEE Transactions On Communications, vol. Com-20, No. 5, Oct. 1972, pp. 912-923.
International Search Report, PCT/US 97/05105, mailed Aug. 28, 1997.

*Primary Examiner*—Nguyen Vo
*Assistant Examiner*—Sam Bhattacharya
*Attorney, Agent, or Firm*—Myers Bigel Sibley & Sajovec

[57] ABSTRACT

A base station for communicating with at least one mobile station in a cellular communications system includes a plurality of receive antennas wherein each receive antenna is oriented to define a respective receive coverage area. The antennas are supported by a support structure so that a first receive antenna defines a first receive coverage area and a second receive antenna defines a second receive coverage area overlapping a portion of the first receive coverage area. First and second wideband receivers are operatively connected to respective first and second antennas. The first wideband receiver receives a first plurality of receive channels from the first receive coverage area, and the second wideband receiver receives a second plurality of receive channels from the second receive coverage area. The first and second pluralities of receive channels include at least one common receive channel. The base station also includes first and second channel splitters operatively connected to the respective first and second wideband receivers for separating the first and second pluralities of receive channels. A diversity combiner is operatively connected to the first and second channel splitters for combining the common receive channel from the first and second channel splitters. Accordingly, an enhanced quality output receive channel is produced.

18 Claims, 13 Drawing Sheets

U.S. PATENT DOCUMENTS

| | | | |
|---|---|---|---|
| 4,128,740 | 12/1978 | Graziano | 179/2 EB |
| 4,204,093 | 5/1980 | Yeh | 370/95 |
| 4,597,105 | 6/1986 | Freeburg | 455/33 |
| 4,630,316 | 12/1986 | Vaughan | 455/129 |
| 4,724,441 | 2/1988 | Fithian et al. | 342/368 |
| 4,814,773 | 3/1989 | Wechsberg et al. | 342/368 |
| 4,823,136 | 4/1989 | Nathanson et al. | 342/368 |
| 4,849,990 | 7/1989 | Ikegami et al. | 375/347 |
| 4,899,165 | 2/1990 | Schadler | 343/890 |
| 5,166,693 | 11/1992 | Nishikawa et al. | 342/422 |
| 5,187,807 | 2/1993 | Alard et al. | 455/17 |
| 5,191,598 | 3/1993 | Bäckström et al. | 375/100 |
| 5,200,759 | 4/1993 | McGinnis | 343/890 |
| 5,276,452 | 1/1994 | Schuss et al. | 342/371 |
| 5,339,086 | 8/1994 | DeLuca et al. | 342/371 |
| 5,471,664 | 11/1995 | Kim | 343/700 MS |
| 5,528,581 | 6/1996 | De Bot | 455/273 |
| 5,684,793 | 11/1997 | Kiema et al. | 455/273 |

OTHER PUBLICATIONS

S.P. Stapleton et al., *A Cellular Base Station Phased Array Antenna System*, IEEE, 1993, pp. 93–96.

Carlo Caini et al., *A Spectrum– and Power–Efficient EHF Mobile Satellite System to be Integrated with Terrestial Cellular Systems*, IEEE Journal On Selected Areas In Communications, vol. 10, No. 8, Oct. 1992, pp. 1315–1325.

Jean–Francois Lemieux et al., *Experimental Evaluation of Space/Frequency/Polarization Diversity in the Indoor Wireless Channel*, IEEE Transactions On Vehicular Technology, vol. 40, No. 3, Aug. 1991, pp. 569–574.

John L. Everett, *Potential developments in hand–held satellite communication terminals*, European Satellite Communications 89: Blenheim Online Publications, 1989, pp. 25–34.

S. A. Bergman et al., *Polarization Diversity In Portable Communications Environment*, Electronics Letter, vol. 22, No. 11, May 22, 1986, pp. 609–610.

Donald C. Cox et al., *Cross–Polarization Coupling Measured for 800 MHz Radio Transmission In and Around Houses and Large Buildings*, IEEE Transactions On Antennas And Propagation, vol. AP–34, No. 1, Jan. 1986, pp. 83–87.

Donald C. Cox, *Antenna Diversity Performance in Mitigating the Effects of Portable Radiotelephone Orientation and Multipath Propagation*, IEEE Transactions On Communications, vol. COM–31, No. 5, May 1983, pp. 620–628.

P. S. Henry et al., *A New Approach to High–Capacity Digital Mobile Radio*, The Bell System Technical Journal, vol. 60, No. 8, Oct. 1981, pp. 1891–1904.

William C.Y. Lee, *Combining Technology*, Chapter 10 of Mobile Communications Engineering, McGraw–Hill Book Company, 1982, pp. 291–336.

OMNI-DIRECTIONAL

DIRECTIONAL (SECTOR)

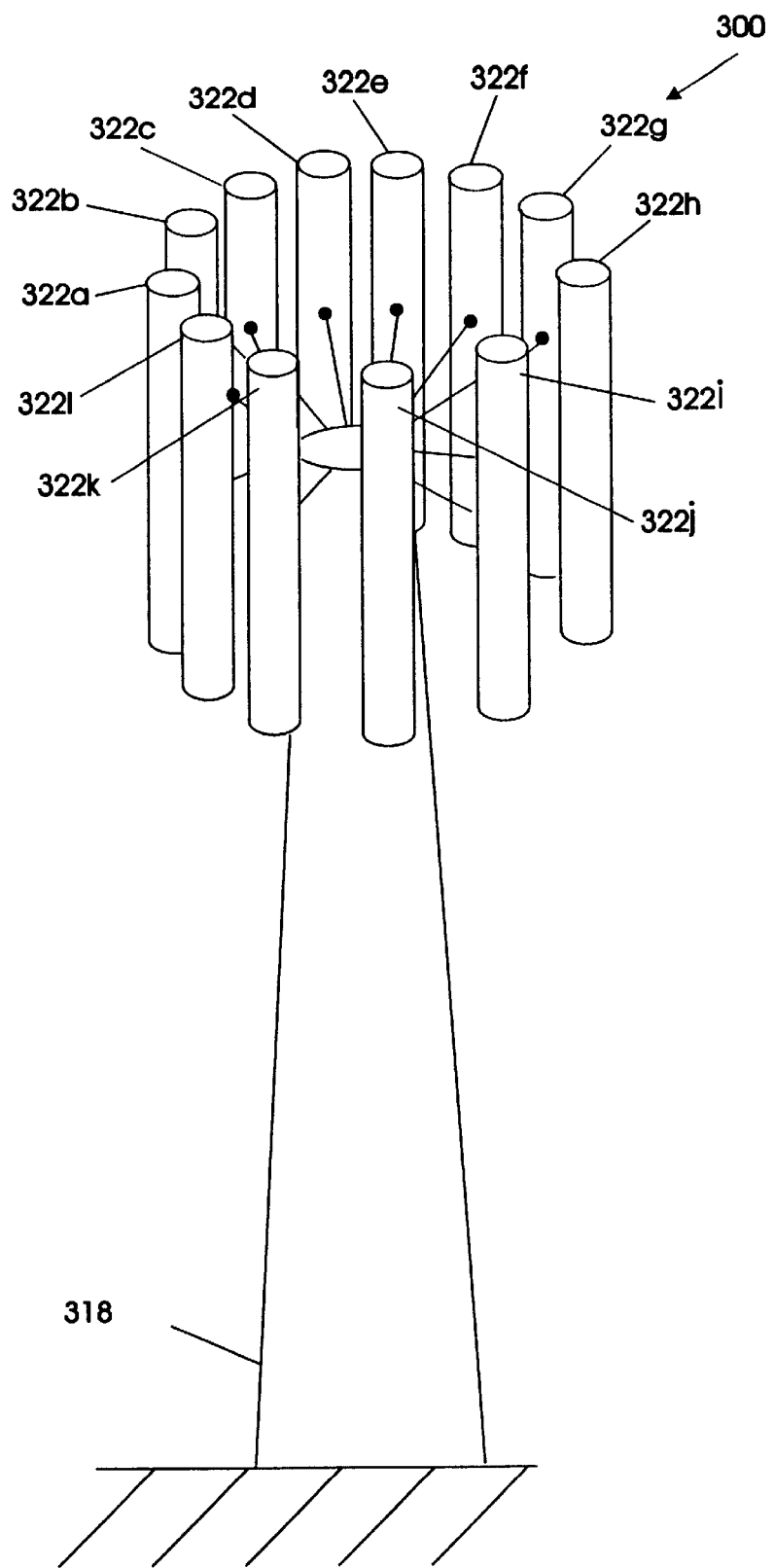

| FIG. 12A |
| FIG. 12B |
| FIG. 12C |

WIDEBAND DIGITIZATION SYSTEMS AND METHODS FOR CELLULAR RADIOTELEPHONES

RELATED APPLICATIONS

The present application is a continuation-in-part of U.S. patent application Ser. No. 08/217,301 filed Mar. 24, 1994, U.S. Pat. No. 5,548,813, and U.S. patent application Ser. No. 08/439,116 filed May 11, 1995, U.S. Pat. No. 5,724,666 and the disclosures of both of these applications are hereby incorporated herein in their entirety by reference.

FIELD OF INVENTION

The present invention is related to systems and methods for wireless communications, and more particularly to systems and methods for wireless cellular communications.

BACKGROUND OF THE INVENTION

Cellular communications systems are commonly employed to provide voice and data communications to a plurality of mobile units or subscribers. Analog cellular systems, such as designated AMPS, ETACS, NMT-450, and NMT-900, have been deployed successfully throughout the world. More recently, digital cellular systems such as designated IS-54B in North America and the pan-European GSM system have been introduced. These systems, and others, are described, for example, in the book titled Cellular Radio Systems by Balston, et al., published by Artech House, Norwood, Mass., 1993.

Frequency reuse is commonly employed in cellular technology wherein groups of frequencies are allocated for use in regions of limited geographic coverage known as cells. Cells containing equivalent groups of frequencies are geographically separated to allow mobile units in different cells to simultaneously use the same frequency without interfering with each other. By so doing, many thousands of subscribers may be served by a system of only several hundred frequencies.

In the United States, for example, Federal authorities have allocated to cellular communications a block of the UHF frequency spectrum further subdivided into pairs of narrow frequency bands called channels. Channel pairing results from the frequency duplex arrangement wherein the transmit and receive frequencies in each pair are offset by 45 MHz. At present there are 832, 30-KHz wide, radio channels allocated to cellular mobile communications in the United States. To address the capacity limitations of this analog system a digital transmission standard has been provided, designated IS-54B, wherein these frequency channels are further subdivided into 3 time slots. In the 1900 MHz bands, the PCS1900 cellular standard provides 200 MHz channels each divided into eight time slots.

As illustrated in FIG. 1, a cellular communication system 20 as in the prior art includes one or more mobile stations or units 21, one or more base stations 23 and a mobile telephone switching office (MTSO) 25. Although only three cells 36 are shown in FIG. 1, a typical cellular network may comprise hundreds of base stations, thousands of mobile stations and more than one MTSO. Each cell will have allocated to it one or more dedicated control channels and one or more voice channels. A typical cell may have, for example, one control channel, and 21 voice/data, or traffic, channels. The control channel is a dedicated channel used for transmitting cell identification and paging information. The traffic channels carry the voice and data information.

The MTSO 25 is the central coordinating element of the overall cellular network 20. It typically includes a cellular processor 28, a cellular switch 29 and also provides the interface to the public switched telephone network (PSTN) 30. Through the cellular network 20, a duplex radio communication link 32 may be effected between two mobile stations 21 or, between a mobile station 21 and a landline telephone user 33. The function of the base station 23 is commonly to handle the radio communication with the mobile station 21. In this capacity, the base station 23 functions chiefly as a relay station for data and voice signals. The base station 23 also supervises the quality of the link 32 and monitors the received signal strength from the mobile station 21.

A typical base station 23 as in the prior art is schematically illustrated in FIG. 2 which shows, as an example, the functional components of model number RBS 882 manufactured by Ericsson Telecom AB, Stockholm, Sweden for the CMS 8800 cellular mobile telephone system. A full description of this analog cellular network is provided in publication number EN/LZT 101 908 F2B, published by Ericsson Telecom AB.

A now common sight along many highways, the base station 23 includes a control unit 34 and an antenna tower 35. The control unit 34 comprises the base station electronics and is usually positioned within a ruggedized enclosure at, or near, the base of the tower. Within this enclosure are the radio control group 37, or RCG, an exchange radio interface (ERI) 38 and a primary power supply 41 for converting electric power from the AC grid to power the individual components within the base station 23, and a backup power supply 42.

The ERI 38 provides signals between the MTSO 25 and the base station 23. The ERI 38 receives data from the RCG 37 and transfers it to the MTSO 25 on a dedicated MTSO-BS link 45. In the reverse direction, the ERI 38 receives data from the MTSO 25 and sends it the RCG 37 for subsequent transmission to a mobile station 21.

The radio control group 37 includes the electronic equipment necessary to effect radio communications. A functional block diagram of an RCG 37 as in the prior art is shown in FIG. 3. The configuration shown illustrates one control channel transmit/receive module (TRM) 51, a number of voice channel TRMs 52, and one signal strength receiver 53, as is a typical configuration required to serve one cell or sector of a cell. Each TRM 51, 52 includes a respective transmitter 54, receiver 55 and control unit 57. The TRMs 51, 52 are not typically frequency agile and operate instead on only one predetermined channel. Control signals from the ERI 38 are received by the individual control units 57. Voice and data traffic signals are routed over a separate interface to the ERI 38.

Each individual transmitter 54 for control and voice is connected to a transmit combiner 58. The transmit combiner combines all of the input signals onto a single output coupled through a coaxial cable 62 to the transmit antenna 63. Through the use of the combiner 58, up to 16 transmitters 54 can typically be connected to a common transmit antenna 63. The combiner 58 is used because there is often a premium for space on the masts and towers used to support the antennas. In an extreme case, one mast may be required to support over 100 radio channels.

On the receive side, each of two receive antennas 65 is coupled to a respective receive combiner 66A, 66B where the signals received are separated according to frequency and passed on to the individual receivers 55 in each of the TRMs 51, 52. The two receive antennas 65 are typically spaced 3 to 5 meters apart on the tower so that they may receive signals with uncorrelated fading patterns to thereby provide space diversity reception. There are many conventional techniques for both pre-detection and post-detection diversity which are described, for example, in Chapter 10 of the book entitled *"Mobile Communications Engineering"*, by William C. Y. Lee, published by McGraw-Hill, 1992.

One visible feature of a typical base station 23 is the antenna tower 35. In order to achieve a reasonable coverage area, the antennas 63, 65 are desirably mounted at some distance above the ground. Referring now additionally to the prior art schematic plan view illustration of FIG. 4A, in rural areas the towers 35 are commonly located at the center of a cell 36 thereby providing omni-directional coverage. In an omni-directional cell, the control channel(s) and the active voice channel(s) are broadcast in all areas of the cell—usually from a single antenna. Where base stations 23 are more densely located, a sectorized antenna system may be employed as in the prior art, and shown by the schematic diagram of FIG. 4B. Sectorization requires directional antennas 70 having, for example, a 120 degree radiation pattern as illustrated in FIG. 4B. Each sector 71 is itself a cell having its own control channel(s) and traffic channel(s). Note that "channel" may refer to a specific carrier frequency in an analog system or to a specific carrier/slot combination in a hybrid TDMA/FDMA system, such as IS-54 and GSM.

FIG. 5A illustrates a typical antenna system as in the prior art and as discussed above. FIGS. 5B and 5C illustrate two types of prior art antennas that have been heretofore discussed—an omni-directional antenna, such as a dipole 66, and a directional sector antenna 70 which further includes a reflector 64, for example. It being understood that transmit and receive antennas are typically of the same type for a given base station.

The use of scanning phased array antennas in cellular communications systems has been proposed. For example, Stapleton, et al., *A Cellular Base Phased Array Antenna System*, Proceedings of the 93rd IEEE VTC, pp. 93–96 describe a circular array of monopole radiating elements to provide 360 degree scanning capability. Stapleton's antenna is designed such that each radiating element has the potential of transmitting on every channel allocated to the cell.

It should be noted that passive microstrip arrays are also currently available for use with cellular base stations. For example, type no. 1309.41.0009 manufactured by Huber+Suhner AG of Herisau, Switzerland is a seven element linearly polarized flat panel passive antenna with a shaped elevation beam for use in cellular base stations. This array can replace the typical dipole antenna and is more suitable for locations on the sides of buildings or other flat surfaces. In application note 20.3, published by Huber+Shuner, it is shown that wide area coverage may be obtained via the use of power-splitters whereby portions of the signals are diverted to several individual panels.

The performance of diversity reception increases as the number of diversity antennas is increased. However, there may not be space on the antenna tower to provide a plurality of diversity antennas for each 1200 or 600 sector. Moreover, the need for a corresponding plurality of diversity receiving channels for each radio channel may increase costs. In addition, the orientation of the linearly polarized mobile antenna may not always be in alignment with the typically vertically polarized receive antenna at the base station. Furthermore, reception at the mobile station may also be subject to fading.

SUMMARY OF THE INVENTION

In view of the foregoing background, it is therefore an object of the present invention to provide an economic cellular communications system base station capable of providing enhanced communication with a mobile station, particularly in view of fading and/or misorientation of the antenna.

This and other objects, advantages and features of the present invention are provided by a base station comprising a plurality of antennas including a first receive antenna defining a first receive coverage area and a second receive antenna defining a second receive coverage area overlapping a portion of the first receive coverage area. Respective wideband receivers are connected to each of the first and second antennas, and each wideband receiver receives a plurality of receive channels from the respective receive coverage area. Furthermore, at least one channel from each plurality of receive channels received by the wideband receivers is a common receive channel.

Accordingly, a mobile station transmitting from the overlap coverage area on the common receive channel is received by both the first and second wideband receivers thereby providing for diversity combination. In addition, the wideband receivers provide that a plurality of channels operating on a plurality of frequencies are received by each antenna without requiring a plurality of receivers.

The base station also includes first and second channel splitters operatively connected to the respective wideband receivers for separating the first and second pluralities of receive channels. In particular, the common receive channel is separated from each plurality of receive channels. A diversity combiner is operatively connected to each of the channel splitters and combines the common receive channel from the first and second channel splitters in order to produce an enhanced quality output receive channel.

The first antenna may receive signals having a first polarization and the second antenna may receive signals having a second polarization allowing the diversity combiner to combine the common receive channel by polarization diversity combination. Furthermore, the first polarization may be right-hand-circular polarization and the second polarization may be left-hand-circular polarization. Accordingly, each antenna may be implemented as an array of patch antenna elements on an elongate substrate.

Furthermore, the different polarizations allow each antenna to both receive and transmit by using polarization isolation. For example the first antenna may define a first transmit coverage area and transmit signals having the second polarization, and the second antenna may define a second transmit coverage area and transmit signals having the first polarization. In addition, the first and second antennas may be adjacent antennas. Accordingly, the base station can include a plurality of circularly arranged antennas wherein every other antenna receives signals having the same polarization and adjacent antennas have overlapping receive coverage areas. This arrangement allows the base station to receive signals from any direction while providing diversity combination.

Each of the receive channels may operate on a predetermined frequency, and the first and second pluralities of receive channels may each comprise receive channels operating on consecutive predetermined frequencies. Accordingly, the bandwidth of the first and second wideband receivers may be reduced thereby reducing the cost of the base station.

Higher order diversity combination can be accommodated by providing more antennas on the base station which define receive coverage areas overlapping the overlap receive coverage area. For example, a third receive antenna may define a third receive coverage area overlapping portions of the first and second receive coverage areas. In addition, a third wideband receiver operatively connected to the third antenna may be adapted to receive a third plurality of receive channels from the third receive coverage area and the third plurality of receive channels may include the at least one common receive channel. A third channel splitter may separate the third plurality of receive channels and the diversity combiner may combine the common receive channel from the first, second, and third channel splitters.

The base station of the present invention provides diversity combination of a receive channel which is received by two or more antennas on the base station. Accordingly, an enhanced quality output channel is produced. In addition, by using a wideband receiver with each antenna, a plurality of receive channels operating on a plurality of frequencies can be received at each antenna without requiring a separate receiver for each frequency for each antenna.

In addition, the bandwidth of each wideband receiver can be reduced by providing that individual wideband receivers receive consecutive frequencies. By reducing the bandwidth required for the majority of the wideband receivers, the overall cost of the system can be reduced.

BRIEF DESCRIPTION OF THE DRAWINGS

FIG. 6 is a plan view of a base station including a plurality of antennas according to the present invention.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to one having skill in the art. Like numbers refer to like elements throughout.

Figure 1:
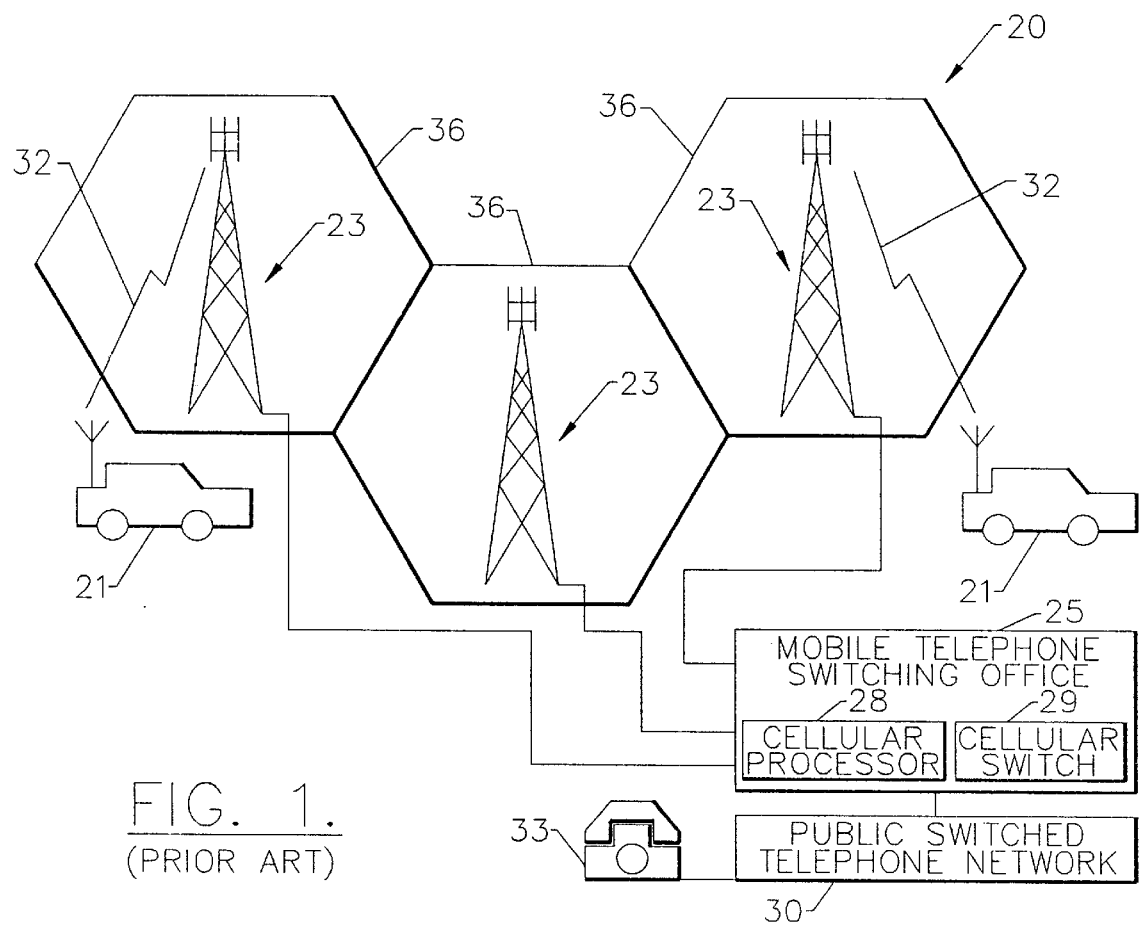
FIG. 1 is a schematic block diagram illustrating the basic components of a cellular communications system as in the prior art.
Figure 2:
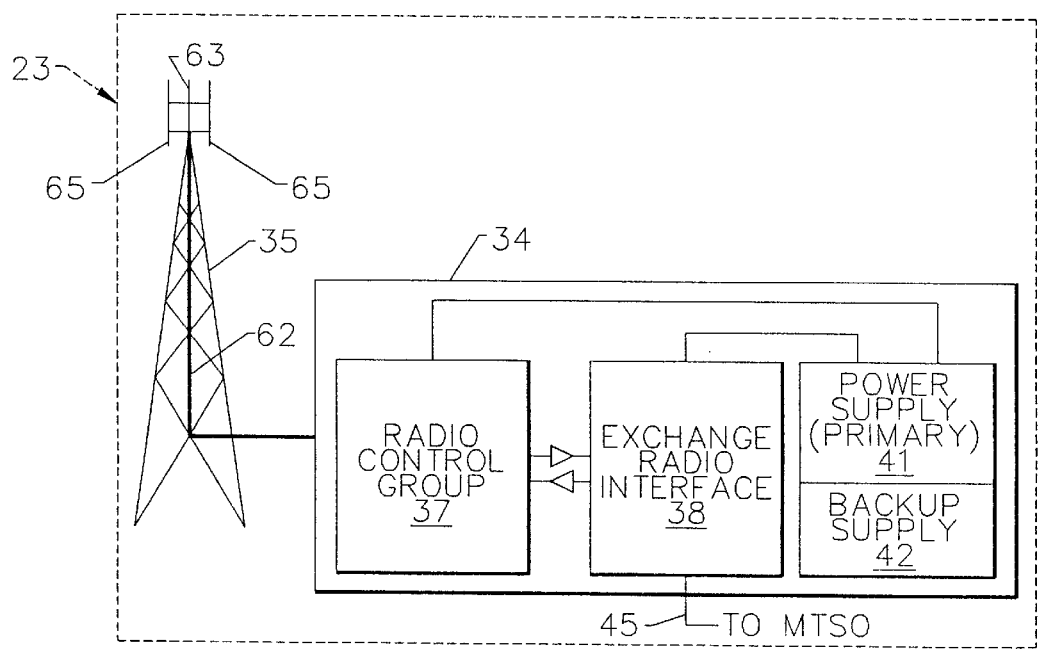
FIG. 2 is a schematic block diagram illustrating the functional components of a cellular communications base station as in the prior art.
Figure 3:
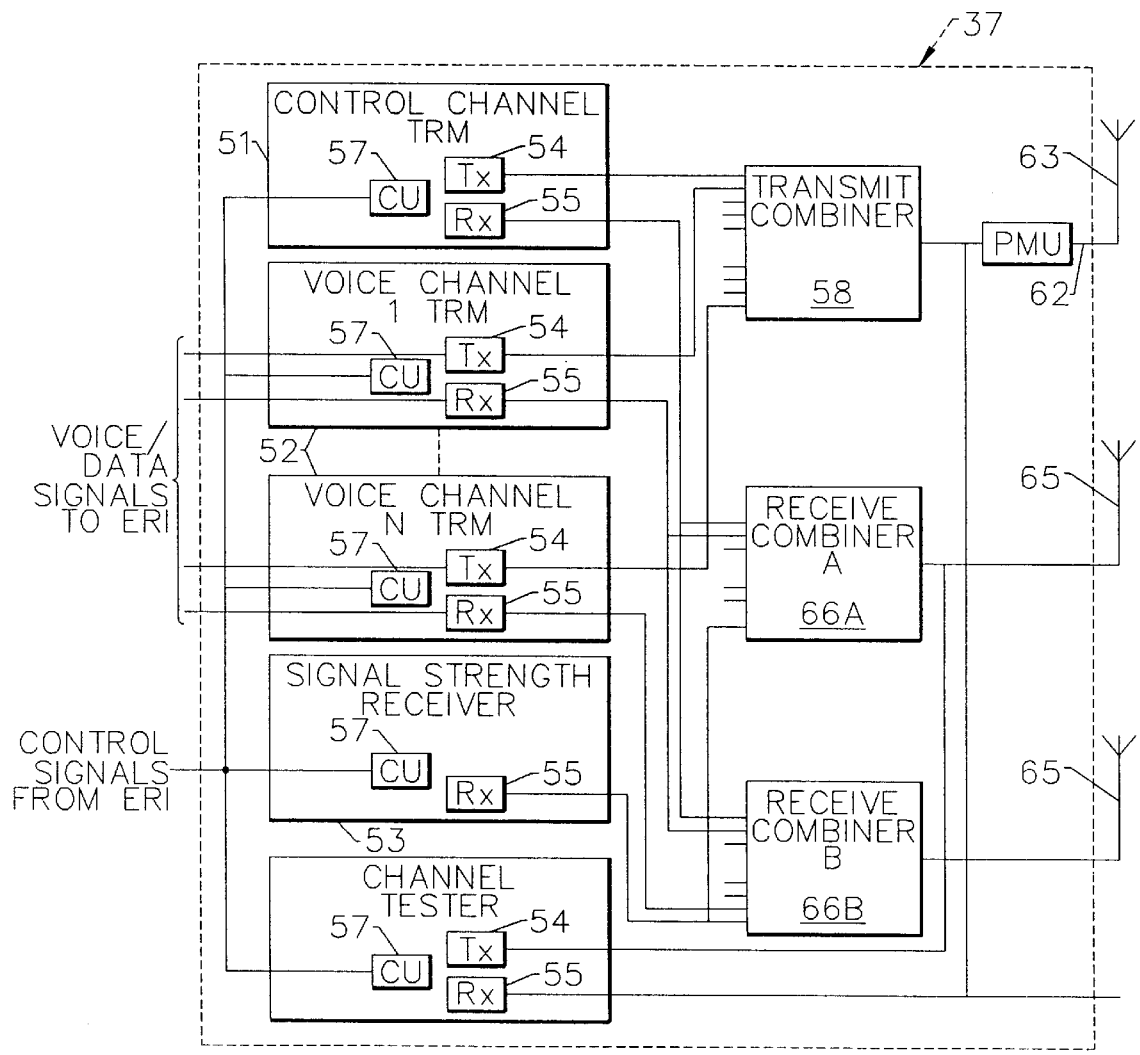
FIG. 3 is a schematic block diagram illustrating the functional elements of Radio Control Group of a base station as in the prior art.
Figure 4A:
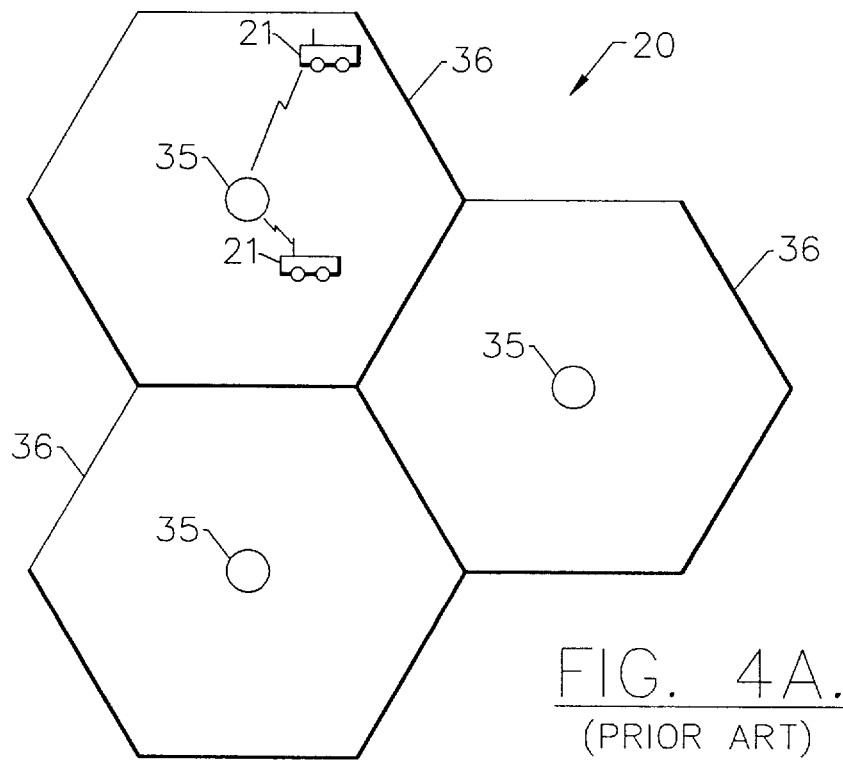
FIG. 4A is a schematic plan view illustrating an omni-directional cellular pattern as in the prior art.
Figure 4B:
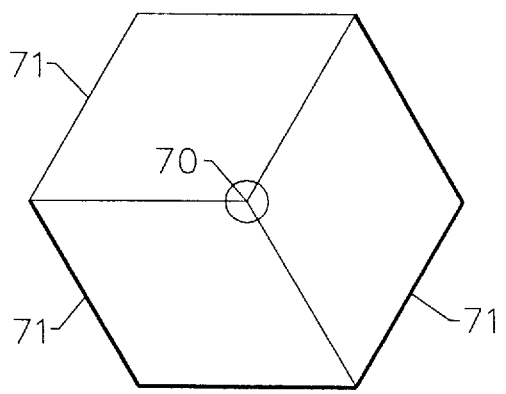
FIG. 4B is a schematic plan view illustrating a sectorized cellular pattern as in the prior art.
Figure 5A:
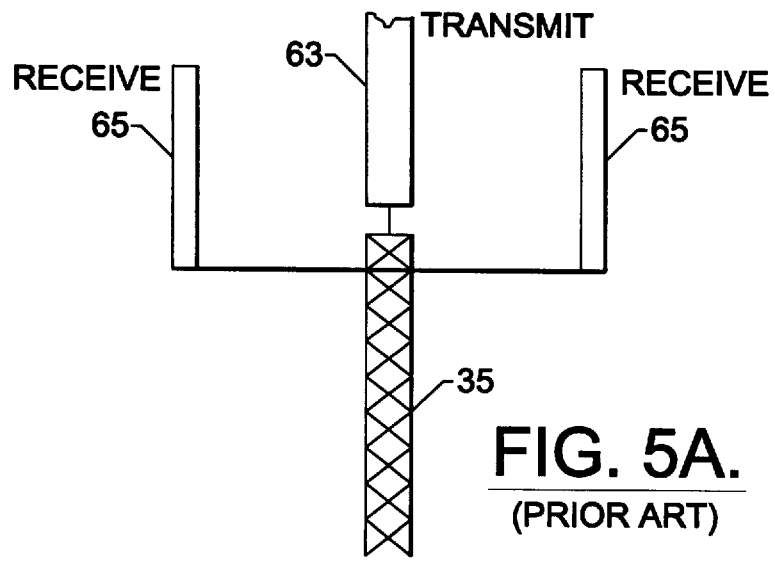
FIG. 5A is a schematic side view illustrating a typical cellular antenna system as in the prior art.
Figure 5B:
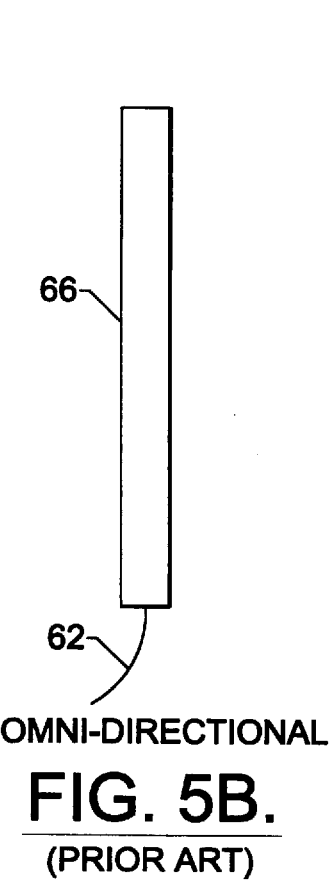
FIG. 5B and 5C are schematic side views illustrating an omni-directional antenna and a sector antenna as in the prior art.
Figure 5C:
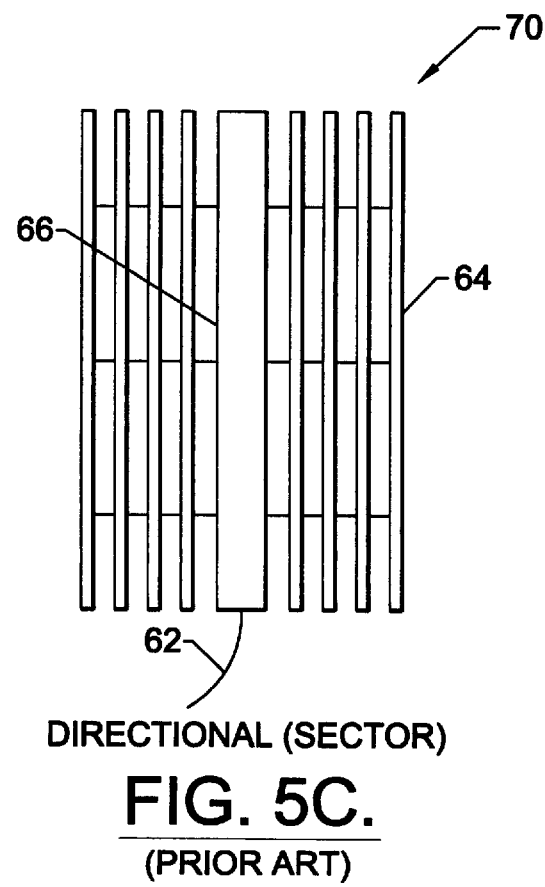
Figure 7:
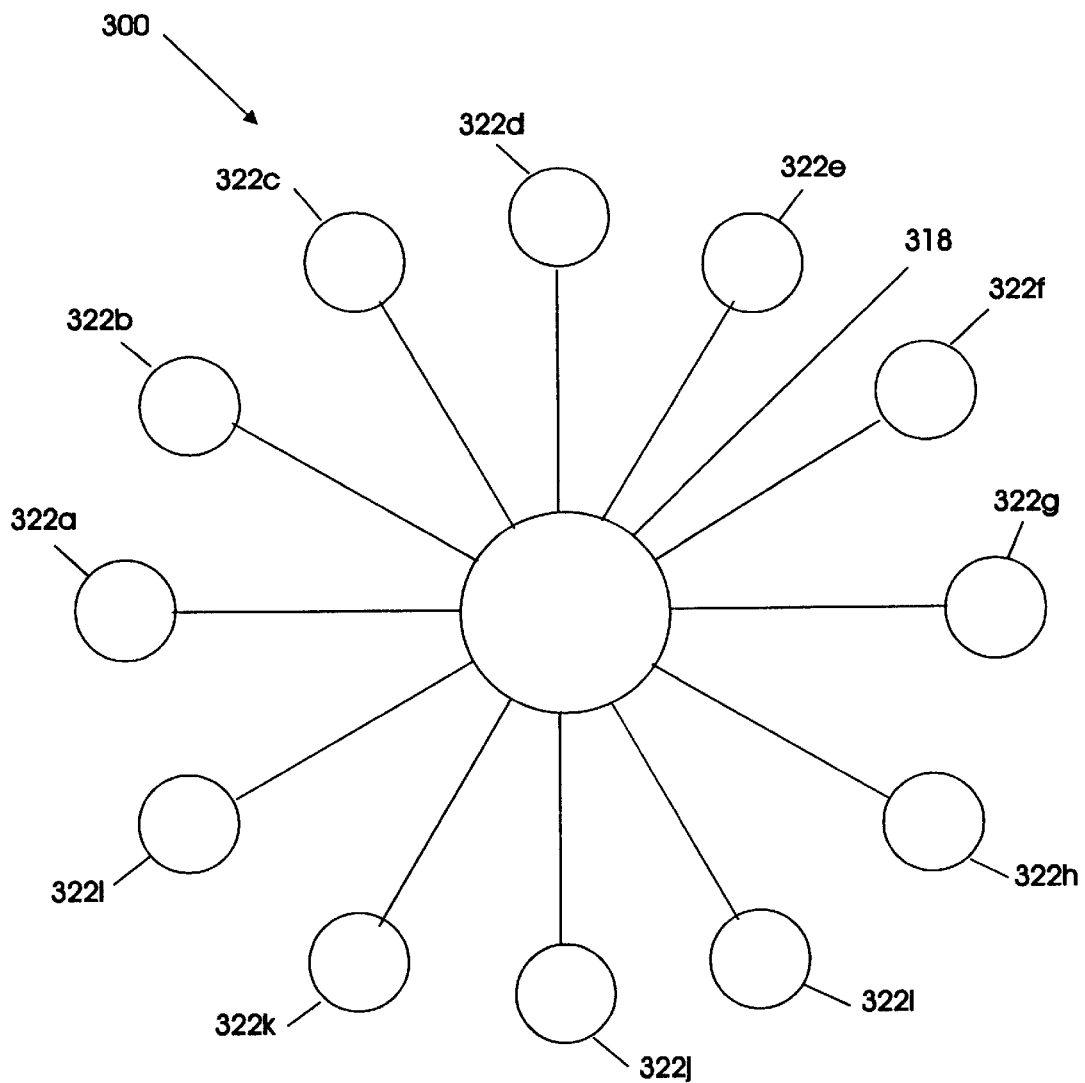
FIG. 7 is a top view of the base station of FIG. 6.

Referring first to FIGS. 6 and 7, a base station 300 including a plurality of antennas 322a-1 is described. The antennas are arranged in a cylindrical pattern to receive signals from any direction. In addition, alternating antennas may be arranged to receive signals having alternating polarizations. For example, antennas 322a, 322c, 322e, 322g, 322i, and 322k can receive signals having a first rotational polarization, while antennas 322b, 322d, 322f, 322h, 322j, and 322l receive signals having a second rotational polarization. More particularly, antennas 322a, 322c, 322e, 322g, 322i, and 322k can receive signals having right-hand-circular polarization, and antennas 322b, 322d, 322f, 322h, 322j, and 322l can receive signals having left-hand-circular polarization. In addition, each of these antennas can transmit using a polarization opposite that used to receive. Alternately, each antenna can receive both polarizations.

Figure 8:
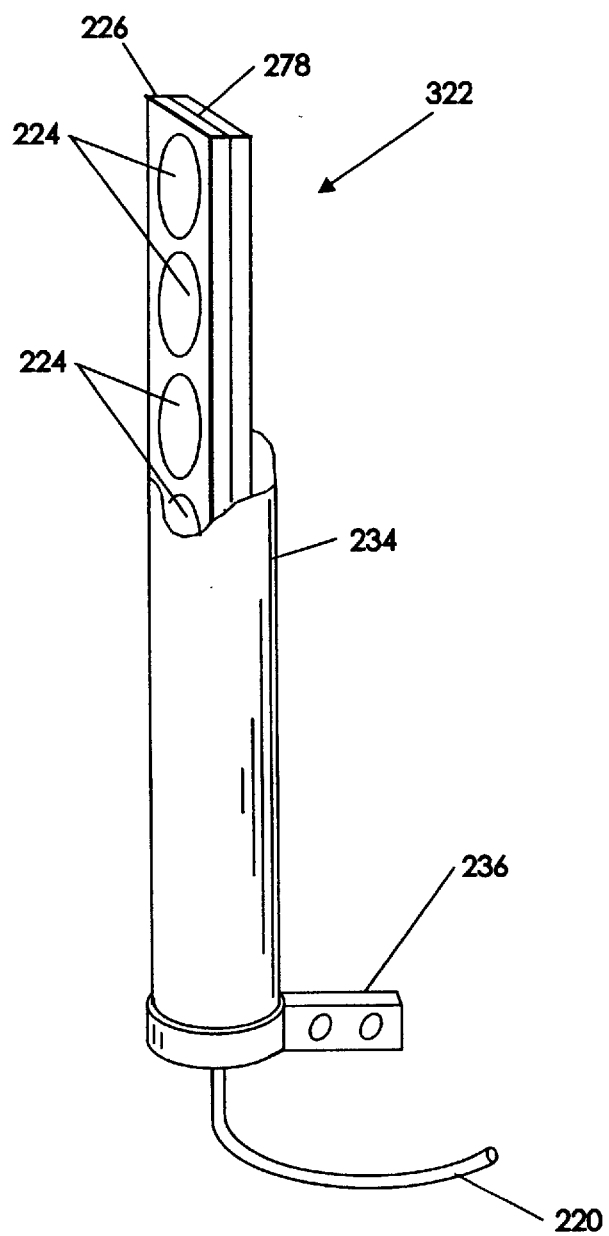
FIG. 8 is a cut away view of an antenna including a plurality of patch antenna elements on an elongate substrate according to FIG. 6.
Figure 9:
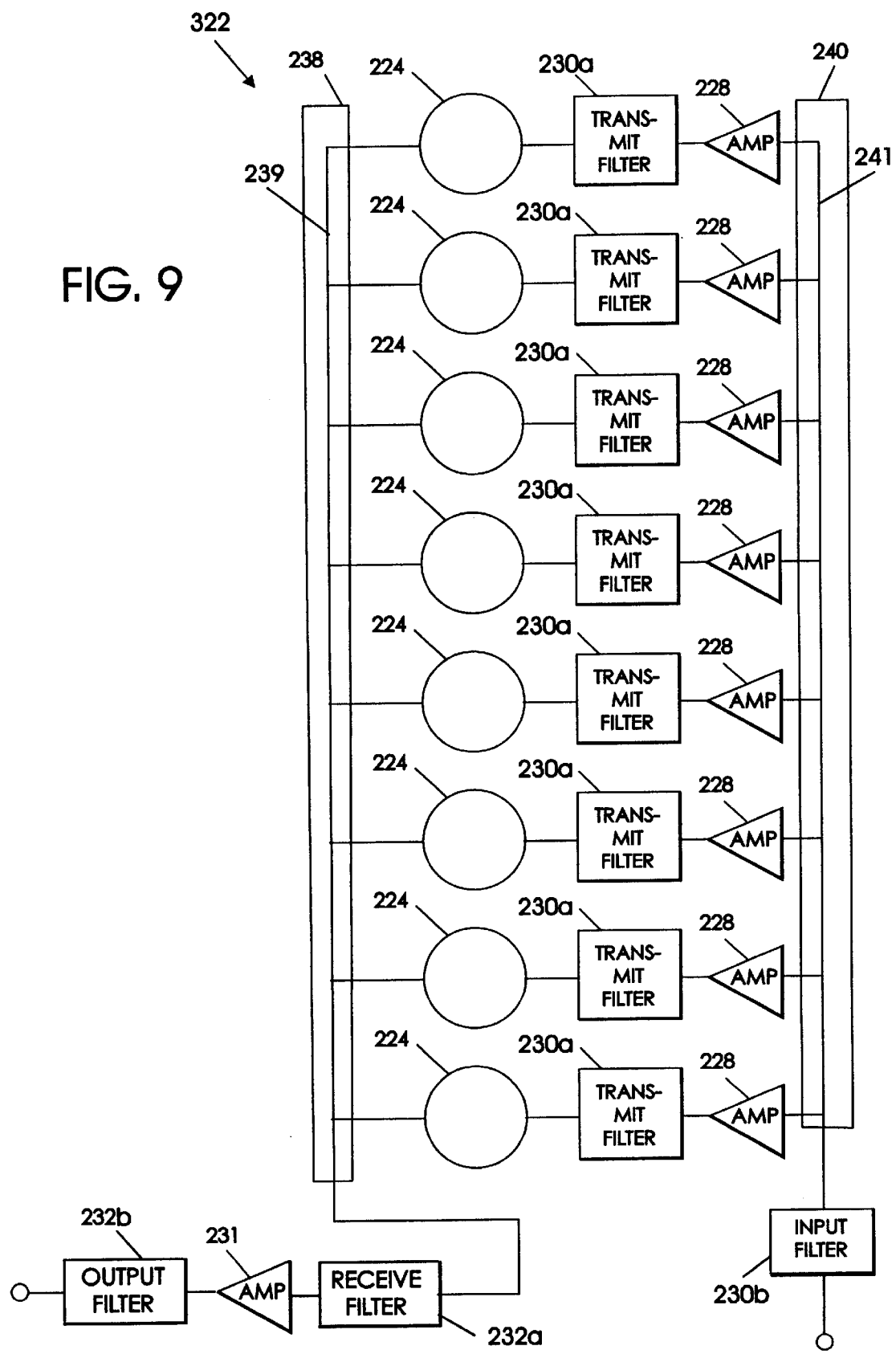
FIG. 9 is a schematic view of an antenna according to FIG. 8.

Each of the antennas 322a-1 preferably includes a plurality of receive antenna elements for receiving signals having a predetermined rotational polarization as discussed above. These antenna elements are arranged in a predetermined pattern to define respective receive coverage areas for each of these antennas. The antenna elements may be circular patch antenna elements (as illustrated in FIGS. 8 and 9) or crossed dipoles as would be readily understood by one having skill in the art. In addition, these antenna elements may serve simultaneously as transmit antenna elements. Antenna mounting means, such as the illustrated antenna mast 318, is preferably provided for mounting the antennas so that the adjacent receive coverage areas defined by adjacent antennas are overlapping.

A cut away of a single antenna 322 is illustrated in FIG. 8. In a preferred embodiment, the antenna includes a plurality of printed circuit board antenna elements 224, such as patch antenna elements. The patch antenna elements 224 are provided on an elongate substrate 226 such as a printed circuit board, and these patch antenna elements can be used as transmit and receive elements simultaneously. The elongate substrate may also be provided with other components such as transmit power amplifiers 228, input 230b or transmit 230a filters, a common receive low noise amplifier ("LNA") 231, and an output filter 232b or receive filter 232a, as illustrated schematically in FIG. 9. As further illustrated in FIG. 8, the elongate substrate 226, with patch antennas 224 is preferably enclosed in a radio-transparent, weatherproof tubular housing 234. A mounting bracket 236 can be used to connect the antenna to the base station mast, and the cable 220 can be used to connect the antenna 322 to the wideband receivers (illustrated in FIG. 12). In addition, a temperature sensor and heater can be included within the housing for colder climates.

As shown schematically in FIG. 9, each antenna element 224 is coupled by first coupling circuit 238 including first coupling line 239 to a common receive filter 232a and low-noise receive amplifier 231. A second coupling circuit 240 including coupling line 241 distributes a transmit signal to the transmit power amplifiers 228. As would be readily understood by one having skill in the art, the transmit amplifiers may be either single carrier power amplifiers (SCPA's) for amplifying a Time Division Multiple Access (TDMA) signal, or multi-carrier power amplifier's (MCPA's) for amplifying a composite of several different carrier frequency signals. In the case that SCPA's are used, a signal is directed towards a single principle direction on a single frequency, while if MCPA's are used, multiple signals on different frequencies can be directed in each direction. In the receive direction, however, the receive low noise amplifier 231 is preferably always capable of receiving and amplifying signals on multiple frequencies. In addition to coupling line 240, the second coupling circuit may include switching means for dynamically partitioning the transmit array to provide transmit sub-arrays operating on different frequencies in the same time slot.

The transmit amplifiers 228 may produce wideband noise outputs at frequencies overlapping the receive frequency band and be of sufficient level to degrade the noise figure of the receive low noise amplifier 231. Accordingly, a transmit filter 230a and receive filter 232a can be used as illustrated. The receive filter 232a may be a band-pass filter tuned to pass the receive frequency band and attenuate transmit frequency signals, while the transmit filter 230a or input filter 230b can be notch filters to attenuate transmission in the receive frequency band and pass the transmit frequency band.

As would be readily understood by one having skill in the art, directivity favoring reception is one way to improve received signal quality. Another way to improve the received signal quality is diversity reception using two or more preferably independent channels, for example, on widely spaced antennas (space diversity), different frequencies (frequency diversity) or different polarizations. The use of different polarizations gives independent fading even when the antennas cannot be widely spaced. Considerable diversity gain is available when combining signals from sources suffering from uncorrelated fading in a joint signal processor, as distinct from just combining signals from different antenna array elements to obtain directive gain.

Typically combining signals from two different antennas experiencing the same signal fading will yield a gain of approximately 3 dB while if the fading is uncorrelated Rayleigh, gains on the order of 7 dB may be obtained. Fading can be uncorrelated on two antennas spaced only inches apart on a mobile phone, but unfortunately due to a geometric magnification effect, the spacing required at a base station can be hundreds of times greater. Relatively close spacing is possible at the mobile station because the multiple paths that cause fading tend to arise due to near field clutter in the vicinity of the mobile station, such as due to reflections from objects within a few tens or hundreds of yards. In the reverse direction, however, these reflections may propagate several miles to the base station causing the geometric magnification of the antenna spacing required at the base station. Accordingly, a spacing of several feet between adjacent antennas at the base station may be insufficient to obtain uncorrelated fading through space diversity.

On the other hand, it is observed that fading is largely uncorrelated when comparing antennas of orthogonal polarizations. Accordingly, the alternate antennas are preferably orthogonally polarized. For example, each of antennas 322a, 322c, 322e, 322g, 322i, and 322k, may use orthogonal rotational polarizations such as right-hand-circular-polarization (RHCP) for receiving and left-hand-circular-polarization (LHCP) for transmitting, while each of antennas 322b, 322d, 322f, 322h, 322j, and 322l may use the opposite polarizations for receiving and transmitting. Accordingly, polarization isolation can be used in a preferred embodiment to help isolate the transmit and receive signals. The receive paths preferably have multi-carrier capability even if the transmitting paths have only single-carrier capability. Therefore, the received signals are received with both RHCP and LHCP which exhibit uncorrelated fading. Upon processing the signals from two or more antennas, a diversity gain is obtained which is greater than the directive gain that would have been obtained had all antennas had like receive polarization.

Figure 10:
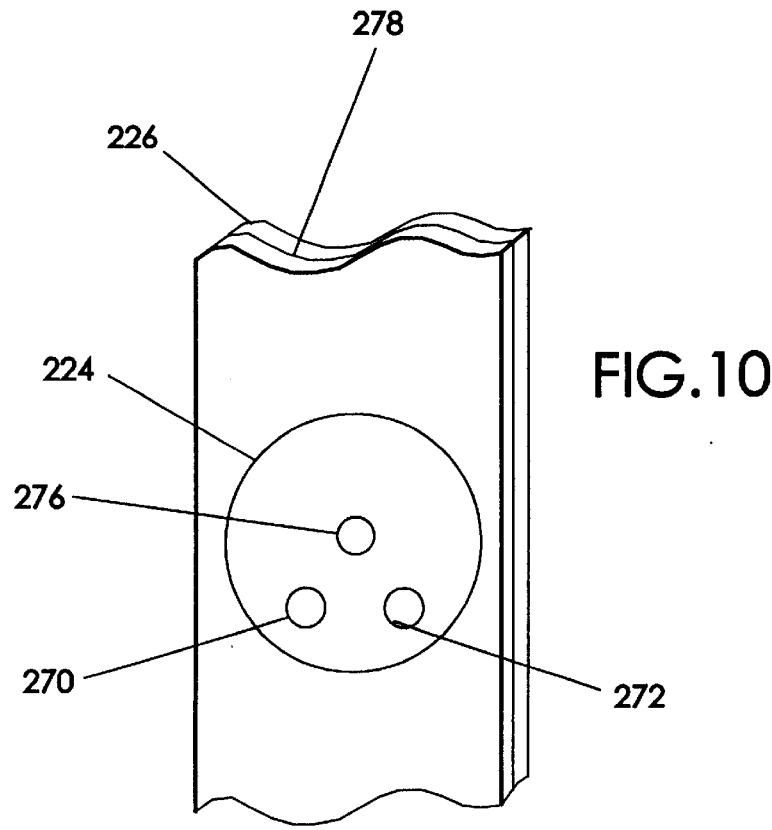
FIG. 10 is a front perspective view of a single patch antenna element on an elongate substrate according to FIG. 8.
Figure 11:
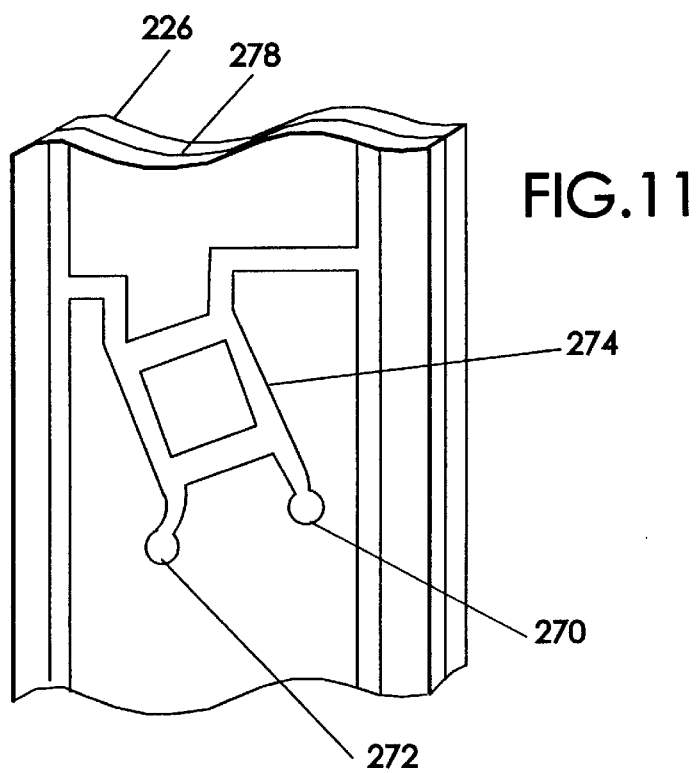
FIG. 11 is a rear perspective view of a single patch antenna element on an elongate substrate according to FIG. 8.

As will be understood by one having skill in the art with reference to FIG. 8, each antenna is preferably fabricated separately on an elongate substrate 226 such as a long thin module or printed circuit board. Printed circuit board antenna elements, such as patch antennas, may be readily fabricated as part of such a module as would be readily understood by one having skill in the art. As shown in FIGS. 10 and 11, a circular patch antenna element 224 may be fed at two feed points 270 and 272, and the two feed points connected to a printed, branch-line quadrature coupler 274 to provide two feed points 270 and 272 of opposite circular or rotational polarization. A ground connection 276 can be used to connect the antenna element 224 to a ground plane 278 shown sandwiched between two layers of the elongate substrate 226. As will be understood by one having skill in the art, active elements, such as amplifiers, and passive elements, such as filters, may also be mounted or constructed on the elongate substrate.

Multiple antennas may be mounted on a single antenna mount. Each antenna thereby provides directivity in the azimuthal plane as well as a narrow beam in the vertical plane, and the antennas may be oriented to cover different azimuthal sectors. This can be done by mounting different collinear antennas around the antenna mast at the same height but pointing to different azimuthal sectors, or by mounting two or more antennas above each other pointing to the same or different azimuthal sectors. In fact, the azimuthal pointing of an antenna may be set independently of where it is mounted, but it is preferred that the antennas be directed so that there is no interference from the other antennas or the mast.

Figure 12A:
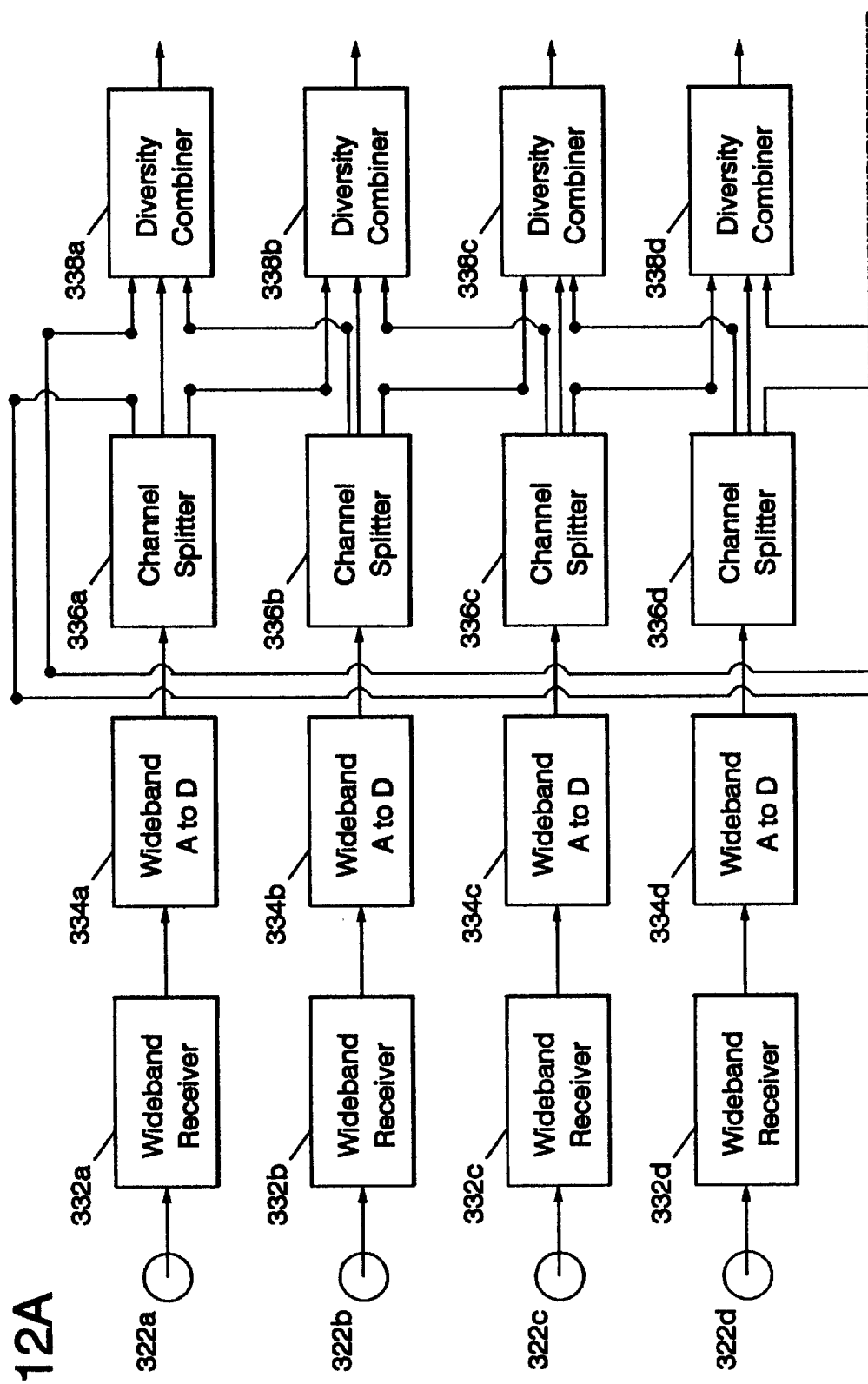
FIG. 12A consisting of FIGS. 12A–C are block diagrams of the antennas of FIG. 6 together with the associated processing blocks.
Figure 12B:
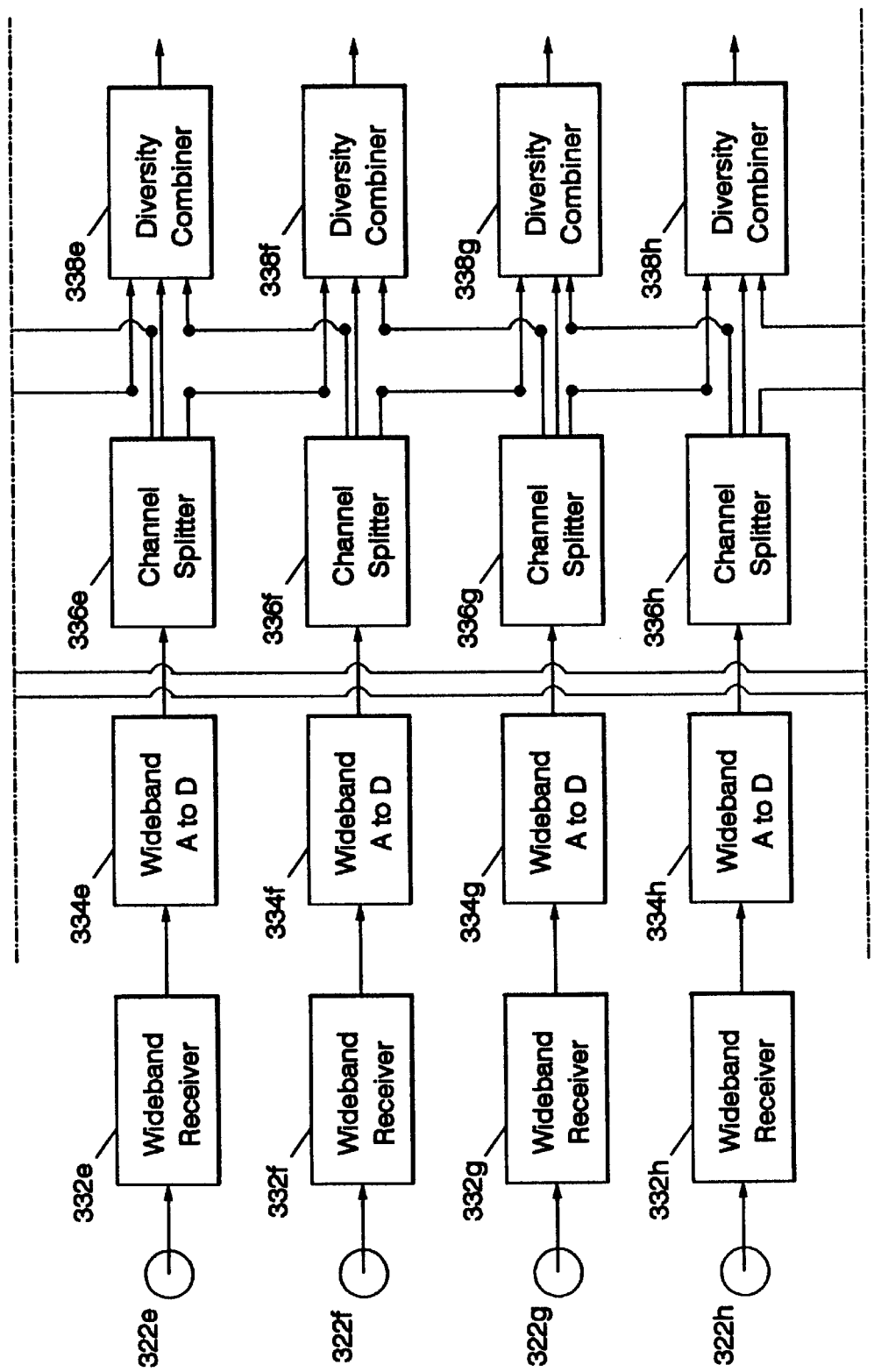
Figures 12, 12C:
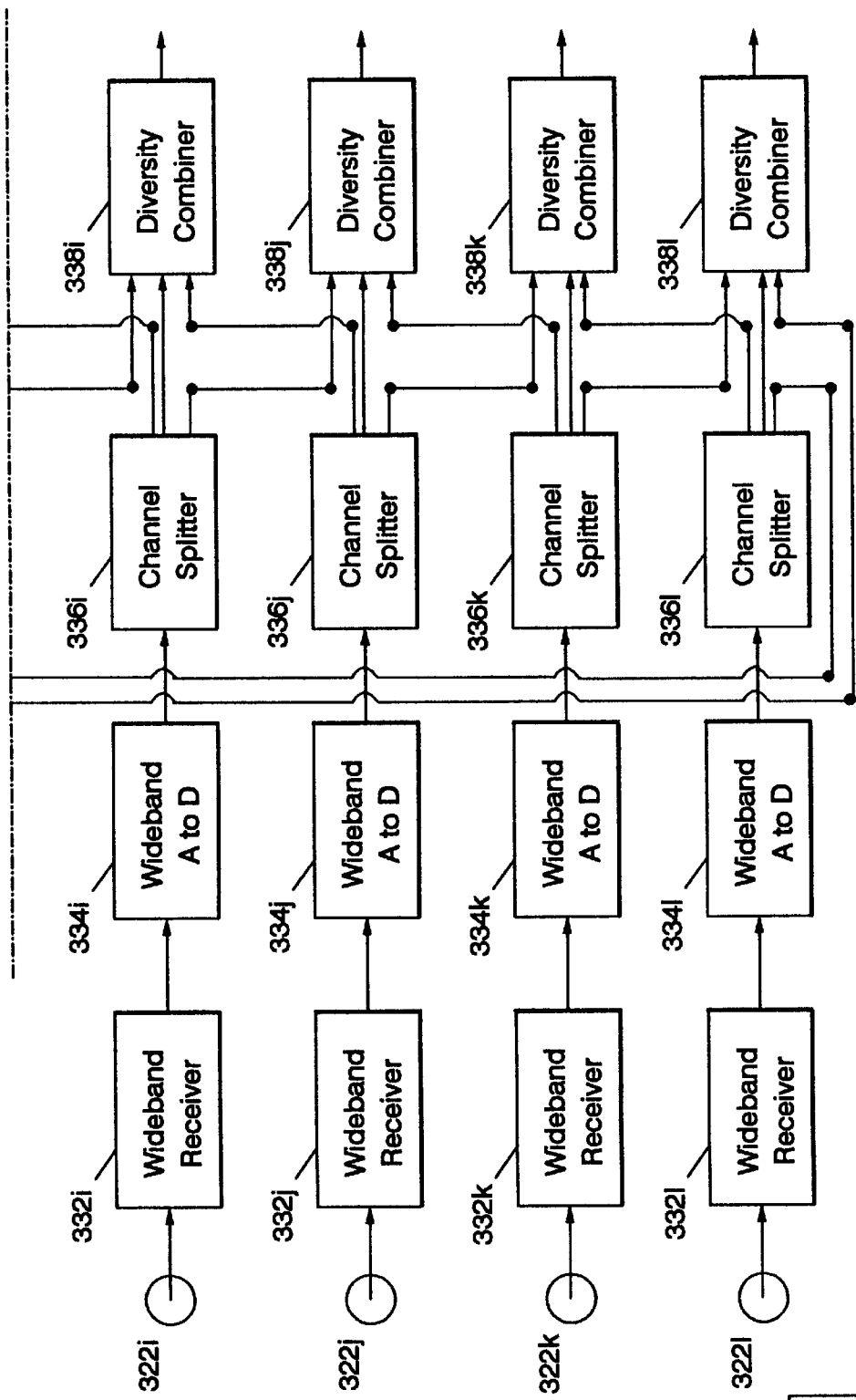

The base station 300 preferably includes a plurality of antennas 322a-1 arranged in a circular pattern, as shown in FIGS. 6 and 7. Signals received from each antenna are applied to respective wideband receivers 332a-1 as shown in FIGS. 12A–C. Signal loss between the antennas and wideband receivers can be reduced by integrating masthead preamplifiers into the antenna assembly of FIG. 8. The masthead preamplifiers provide gains ahead of cables used to connect the antennas and wideband receivers. Optionally, masthead down conversion to an intermediate frequency can be used.

As will be understood by one having skill in the art, a wideband receiver is a receiver which receives signals having frequencies over a predetermined range of frequencies so that a plurality of cellular frequencies is received. As discussed in U.S. patent application Ser. No. 08/601,768, entitled "Multichannel Receiver Using Analysis By Synthesis" to Paul W. Dent, and filed Feb. 15, 1996, a wideband receiver can separate individual frequency channels spaced, for example, by 30 KHz (AMPS) or 200 KHz (PCS1900). This application is hereby incorporated herein in its entirety by reference.

The use of wideband receivers allows a plurality of frequencies to be received at each antenna without requiring a plurality of single frequency receivers to be connected to each antenna. In the embodiment shown in FIG. 8, the base station is adapted to receive twelve frequencies, and each wideband receiver is adapted to receive three of these frequencies. In particular, each frequency is received by three adjacent antennas and associated wideband receivers.

As an example, the wideband receivers can be adapted so that each antenna 322a-1 receives three frequencies f as shown in Table 1.

TABLE 1

| Antenna | Frequencies |
| --- | --- |
| 322a | $f_{12}, f_1, f_2$ |
| 322b | $f_1, f_2, f_3$ |
| 322c | $f_2, f_3, f_4$ |
| 322d | $f_3, f_4, f_5$ |
| 322e | $f_4, f_5, f_6$ |
| 322f | $f_5, f_6, f_7$ |
| 322g | $f_6, f_7, f_8$ |
| 322h | $f_7, f_8, f_9$ |
| 322i | $f_8, f_9, f_{10}$ |
| 322j | $f_9, f_{10}, f_{11}$ |
| 322k | $f_{10}, f_{11}, f_{12}$ |
| 322l | $f_{11}, f_{12}, f_1$ |

Each frequency for the base station is received by three adjacent antennas and respective wideband receivers, and as previously discussed, alternating antennas receive the frequency with alternating polarizations. Accordingly, polarization diversity reception can be achieved.

Each receive channel operates on a predetermined frequency which is allocated to the base station. As shown in Table 1, a base station with 12 antennas can be allocated 12 frequencies $f_{1-12}$, and each wideband receiver can be adapted to receive a unique combination of three of these frequencies. Furthermore, each frequency is preferably received by three adjacent antennas defining an overlap receive coverage area common to all three antennas.

By allocating the frequencies as shown in Table 1, and providing that:

$$f_1 < f_2 < f_3 < f_4 < f_5 < f_6 < f_7 < f_8 < f_9 < f_{10} < f_{11} < f_{12}$$

or alternately that:

$$f_1 > f_2 > f_3 > f_4 > f_5 > f_6 > f_7 > f_8 > f_9 > f_{10} > f_{11} > f_{12}$$

the bandwidth of the wideband receivers can be reduced. In particular, wideband receivers 332b–k can be adapted to receive consecutive frequencies. Only wideband receivers 332a and 332l receive non-consecutive frequencies in this arrangement. By reducing the bandwidth required for the majority of the wideband receivers, the overall cost of the system can be reduced. Furthermore, the circle of overlapping receivers can be extended to greater than one full turn of 360° by adding receivers for frequencies $f_{13}$–$f_{24}$ using the same antennas. Only the first and last receivers in this sequence do not receive consecutive channels.

As will be understood by one having skill in the art, each frequency can support one or more cellular communication receive channels. For example, in a cellular system supporting a Time Division Multiple Access ("TDMA") standard such as GSM, each frequency can be divided into eight receive channels. Accordingly, each channel is received by three antennas in the example of Table 1. Furthermore, higher orders of diversity can be achieved by providing antennas and wideband receivers capable of receiving more frequencies, thus obtaining overlap of frequency for more than three antennas. For example, each frequency (and therefor each receive channel) can be received by five adjacent antennas using 5-channel wideband receivers.

As shown in FIGS. 12A–C, a wideband receiver 332a is operatively connected to each respective antenna 322a. The wideband receiver for each antenna is adapted to receive a predetermined plurality of receive channels from a receive coverage area (shown in FIG. 13) for that antenna. For example, each wideband receiver can receive three frequencies with as many as eight time slots per frequency, when TDMA is used. Wideband A-to-D converters 334a-1 can be used to convert the signal generated by the respective wideband receiver 332a-1 into a digital signal. These digital signals can then be separated into separate receive channels by respective digital channel splitters 336a according to frequency and time slot. Respective diversity combiners 338a-1 combine common receive channels from adjacent antennas to produce an enhanced quality output receive channel.

In the embodiment of FIGS. 12A–C, three frequencies are received by each antenna, and each frequency supports one receive channel using FDMA or multiple channels using TDMA having multiple time slots. It will be understood by one having skill in the art that the diversity combiners can operate sequentially for each time slot in order to adapt to different mobile signals in each time slot arriving from slightly different directions within the same sector. Furthermore, a single frequency can be received by more than three antennas by providing the appropriate wideband receivers, and making the additional connections between the channel splitters and the diversity combiners.

Figure 13:
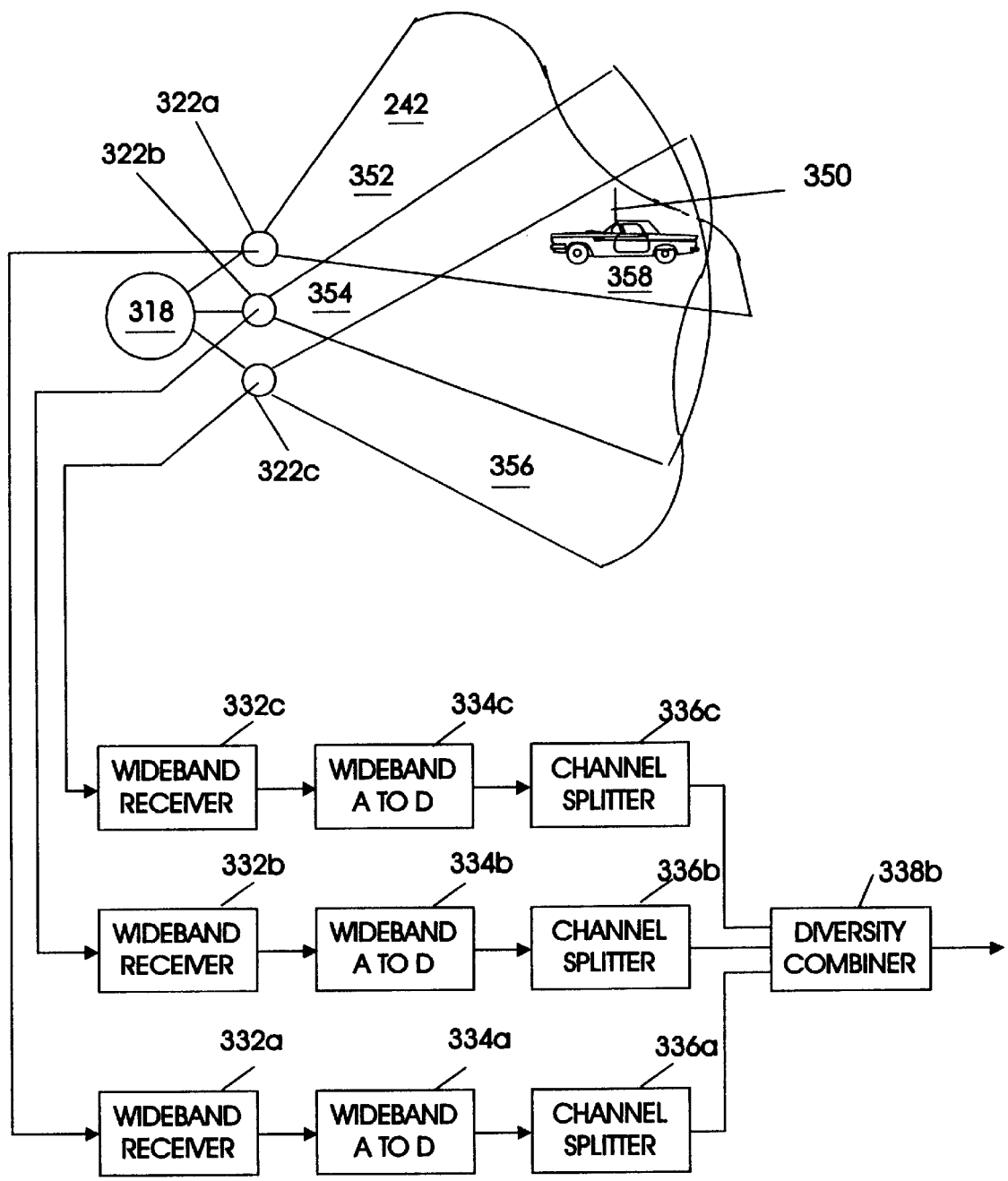
FIG. 13 is a top view of a portion of the base station of FIG. 6 illustrating three adjacent antennas and the respective overlapping receive coverage areas.

In FIG. 13, three adjacent antennas 322a–c from the base station 300 of FIGS. 7 and 8 are illustrated together with the associated wideband receivers 332a–c, wideband analog-to-digital converters 334a–c, channel splitters 336a–c, and diversity combiner used to process a receive channel from a mobile station 350, such as an automobile cellular radiotelephone. As shown, a support structure such as an antenna mast 318 is used to support the antennas so that each antenna defines a respective receive coverage area, and a portion of all three receive coverage areas overlap. The first antenna 322a defines the first receive coverage area 352, the second antenna 322b defines the second receive coverage area 254, and the third antenna 322c defines the third receive coverage area 356. Portions of all three receive coverage areas overlap in the overlap coverage area 358.

In addition, the wideband receivers 332a–c are each adapted to receive a common receive frequency, and this common receive frequency can accommodate one or more common receive channels using TDMA time slots or CDMA codes. For purposes of description, a single common receive channel will be described, but one having skill in the art will understand that multiple channels can be accommodated according to the present invention using TDMA or CDMA on a single frequency channel. Accordingly, the mobile station 350 in the overlap coverage area 358 can transmit over the common receive channel on the common frequency to all three antennas 322a simultaneously.

The channel is received at each of the wideband receivers 332a–c and converted to digital signals by each of the wideband analog-to-digital converters 334a–c. In addition, other channels on other frequencies can be received by each of the antennas and wideband receivers. Accordingly, the digital splitters separate the common receive channel. Because each of the three antennas receive the common receive channel from a different path, the diversity combiner 338*b* is used to combine the common receive channel as received by each of the antennas in order to produce an enhanced quality receive channel. As will be understood by one having skill in the art, the wideband analog-to-digital converters, channel splitters, and diversity combiners can be implemented separately or in combination using special purpose computers, general purpose computers with special purpose software, special purpose hardware, or combinations thereof.

In particular, the first antenna 332*a* and third antenna 332*c* can receive signals having a first polarization, and the second antenna 332*b* can receive signals having a second polarization different from the first polarization. Accordingly, the signals can be combined using a polarization diversity combiner. More particularly, the first polarization can be right-hand-circular polarization, and the second polarization can be left-hand-circular polarization.

By using antennas comprising arrays of patch antenna elements 224 as illustrated in FIGS. 8, 9, 10, and 11, the antennas can transmit as well as receive. By transmitting on a polarization opposite that used to receive, polarization isolation can be used to accommodate both transmission and reception. For example, the first antenna 322*a* and third antenna 322*c* define first and third transmit coverage areas which can be the same as the respective receive coverage areas, and the second antenna 322*b* defines a second transmit coverage area that can be the same as the second receive coverage area. The first and third antennas receive signals having a first polarization such as right-hand-circular polarization, and transmit signals having a second polarization such as left-hand-circular polarization. The second antenna receives signals having the second polarization and transmits signals having the first polarization. When a mobile receiver lies in the overlap region between two antenna patterns, alternate TDMA bursts destined for that mobile receiver may be transmitted from first alternating with a second antenna of opposite polarization, thus obtaining polarization diversity transmission.

While the common receive channel is shown as being received by three antennas on the base station, one having skill in the art will understand that the channel can be received by more antennas simultaneously. For example, in a base station with 12 antennas evenly spaced in a circular pattern around a mast with each antenna defining a 120° azimuthal receive coverage area, up to seven antennas can receive a channel being transmitted by a single mobile station. In this case, each wideband receiver can receive seven frequencies and each diversity combiner can be connected to seven channel splitters to combine channels from the seven antennas.

The diversity combiners 338*a–l* preferably include signal quality determining means for determining signal-to-noise ratios of the respective receive channels, and weighting means for weighting the receive channels based upon the respective signal-to-noise ratios thereof to thereby generate the enhanced quality output receive signal. The determination of signal-to-noise ratios and weighted processing of diverse receive signals is disclosed in U.S. Pat. No. 5,191,598 to Bäckström et al., the entire disclosure of which is incorporated herein by reference. In addition, patent application Ser. No. 08/251,202 entitled "Diversity Receiver for Signals With Multipath Time Dispersion" to Bottomley and filed May 21, 1994 discloses an alternate diversity receiver technique. This application is hereby incorporated herein by reference.

Alternately, both polarizations can be received on each antenna, either by constructing receive only antennas or by using duplexing filters in place of transmit filters 230*a*, as shown in FIG. 9. In this case, a first receive signal having a polarization orthogonal with respect to the transmit signal is fed to the amplifier 231, as before. In addition, a second received signal is separated from the transmit path, wherein the second received signal has the same polarization as the transmitted signal. A separate amplifier, similar to amplifier 231 can be added for this extra receive path, and both polarizations of received signals from one or more antennas can be fed to respective wideband receivers.

Each active antenna 322 can include a plurality of RF power transmit amplifiers 228 each coupled through a transmit filter 230*a* to an individual radiating transmit antenna element 224, as shown in FIG. 9. The antenna elements 224 can be used to both transmit and receive simultaneously. Power can be distributed to each power amplifier 228 via a power dividing network such as coupling circuit 240. In this embodiment, the above-mentioned components are preferably fabricated using stripline or microstrip techniques on a mounting substrate, such as a glass-epoxy printed circuit board, as would be readily understood by one having skill in the art. Dividing means, such as coupling circuit 240, can include a plurality of inputs and switching means to select which input signals are distributed to which amplifiers 228. The switching means can be activated by pre-programmed control means to determine for each time slot if the full array is used at one transmit frequency or if transmit sub-arrays are formed for transmitting multiple frequencies simultaneously.

The receive antenna elements 214 are coupled to a common output via a combining network such as coupling circuit 238. Basically the inverse of the power dividing network, the combining network coherently couples the signals received from array elements 214 into a common output. The combining network may introduce phase offsets or tapered coupling in order to effect beam shaping or to reduce vertical sidelobes, and to reduce unwanted deep nulls to mobiles very close to the mast.

The output of the combining network is illustratively coupled to a receive filter 232*a* and a low-noise amplifier (LNA) 231. Traditionally, a similar LNA was located in the RCG of a conventional base station, and, accordingly, the received signal suffered 2–4 dB of transmission loss through the IFL cabling. By locating the LNA 231 on the receive antenna 322 in accordance with another advantage of the present invention, losses prior to amplification are reduced thereby benefitting the overall system noise figure and allowing an increase in site/cell radius or a reduction in mobile power output to increase battery life.

The amplified receive signal from the LNA 231 is also preferably filtered to remove unwanted signal components, such as those generated by the power transmit amplifiers 228 that are not always removed by receive filter 232*a*. Therefore the output of LNA 231 is preferably coupled to a band-pass filter such as output filter 232*b*. The band-pass filter may be a microstrip edge coupled filter, such as described in Chapter 6 of Bahl, et al., *Microwave Solid State Circuit Design*, Wiley & Sons, 1988, a high-k ceramic resonator filter, or a SAW filter. Depending on the system bandwidth and transmit/receive duplex spacing, a low-pass, or high-pass filter may also be acceptable as would be readily understood by one having skill in the art.

Both the transmit signals and the receive signals are coupled to/from the antennas 322*a–l* via a cable such as an interfacility link (IFL). The IFL preferably comprises a bundle of coaxial cables, and power cables to provide power to the power transmit amplifiers 228 and the LNA 231.

The invention also includes a method for operating a cellular base station which communicates with at least one mobile station as shown in FIG. 13. A first receive coverage area 352 is defined by the first antenna 322a, and a second receive coverage area 354 is defined by the second antenna 322b. These receive coverage areas overlap as shown in the overlap receive coverage area 358. A first plurality of receive channels are received from the first receive coverage area 352 by a first wideband receiver 332a, and a second plurality of receive channels are received from the second receive coverage area 354 by a second wideband receiver 332b.

The first and second pluralities of receive channels include at least one common receive channel. The common receive channel is separated from each of the first and second pluralities of receive channels by channel splitters 336a and 336b. The common receive channel from the first receive coverage area 352 and the second receive coverage area 354 are combined by the diversity combiner 338b in order to produce an enhanced quality output receive channel.

The first plurality of receive channels can be received having a first polarization such as right-hand circular polarization, and the second plurality of receive channels can be received having a second polarization such as left-hand-circular polarization. The method can also include the steps of transmitting signals having the second polarization from the first antenna 322a into the first receive coverage area 352, and transmitting signals having the first polarization from the second antenna 322b into the second receive coverage area 354. Accordingly, the same antennas can be used to both transmit and receive by using polarization isolation to separate the transmit and receive signals.

In this method, each of the receive channels can operate on a predetermined frequency, and the first and second pluralities of receive channels can each comprise receive channels operating on consecutive predetermined frequencies. Accordingly, the bandwidth required for the wideband receivers can be reduced.

A third receive coverage area 356 can be defined by the third antenna 322c so that a portion of the third receive coverage area 356 overlaps the first and second receive coverage areas in the overlap receive coverage area 358. A third plurality of receive channels can be received from the third receive coverage area 356 by a third wideband receiver 332c, and the third plurality of receive channels preferably includes the common receive channel. The third plurality of receive channels can be separated by the channel separator 336c. Accordingly, the common receive channel from the first, second, and third channel splitters can be combined by the diversity combiner 338b.

Antenna azimuthal radiation patterns similar to conventional 120° sector patterns can be used such that considerable overlaps of adjacent coverage areas of adjacent antennas is deliberately arranged. The space and polarization diversity combining can alternately be viewed as adaptive array processing, and can be designed either to increase desired signal reception, reduce interference, or to increase signal-to-interference ratios as described in U.S. patent application Ser. No. 08/284,775 entitled "Interference Rejection Combining" to Bottomley. This patent application was filed on Aug. 2, 1994, and is hereby incorporated herein by reference.

As shown in FIGS. 6 and 7, the base station 300 of the present invention can be implemented with twelve antennas 322a–l distributed around the mast 318 in azimuth. Each antenna can have an azimuthal pattern with a signal attenuation of −3 dB over a 60° beamwidth and a signal attenuation of −12 dB over a 120° beamwidth. Each antenna is preferably used to transmit only a single frequency at a time. By uniformly distributing the frequencies in azimuth, gain arises in both transmission and reception by connecting a call from a mobile station to the antenna defining the receive coverage area in which the mobile station is most centrally located.

With twelve antennas to choose from, the mobile station can be best served by the nearest base station, in contrast to prior systems in which the nearest base station may not have an antenna pointing in the optimum direction. With azimuthally distributed frequencies, the maximum range to the best base station with twelve antennas can be reduced by 4.9 dB in path loss terms. The average gain on the C/I (co-channel interference) probability distribution can be expected to be about 3 dB with 12 antennas and about 2 dB with 6 antennas. Further gains are possible through use of higher order diversity on interference rejection combining.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications of these embodiments are intended to be included within the scope of the appended claims.

That which is claimed is:

1. A cellular base station for communicating with a mobile station in a cellular communications system over one of a plurality of cellular communications channels, said base station comprising:

a plurality of receive antennas for receiving signals from the mobile station over the cellular communications channel wherein each receive antenna is oriented to define a respective receive coverage area;

a support structure for supporting said plurality of receive antennas so that a first receive antenna defines a first receive coverage area and a second receive antenna defines a second receive coverage area overlapping a portion of said first receive coverage area;

a first wideband receiver operatively connected to said first receive antenna, wherein said first wideband receiver receives a first plurality of receive cellular communications channels from said first receive coverage area;

a second wideband receiver operatively connected to said second receive antenna, wherein said second wideband receiver receives a second plurality of receive cellular communications channels from said second receive coverage area and wherein said first and second pluralities of receive channels include the one common receive cellular communications channel from the mobile station;

first and second channel splitters operatively connected to said respective first and second wideband receivers for separating said first and second pluralities of receive cellular communications channels; and a diversity combiner operatively connected to said first and second channel splitters for combining said common receive cellular communications channel from said first and second channel splitters to produce an enhanced quality output receive channel from the mobile station;

wherein each of said receive cellular communications channel operates on a predetermined cellular frequency and said first and second pluralities of receive cellular communications channels each comprise receive channels operating on consecutive predetermined cellular frequencies.

2. A base station according to claim 1 wherein said first receive antenna receives signals having a first polarization and said second receive antenna receives signals having a second polarization different from said first polarization, and wherein said diversity combiner comprises a polarization diversity combiner.

3. A base station according to claim 2 wherein said first polarization comprises right-hand-circular polarization and said second polarization comprises left-hand-circular polarization.

4. A base station according to claim 2 wherein said first and second receive antennas are adjacent receive antennas.

5. A base station according to claim 1 further comprising:
   a third receive antenna defining a third receive coverage area overlapping portions of said first and second receive coverage areas;
   a third wideband receiver operatively connected to said third receive antenna, wherein said third wideband receiver receives a third plurality of receive cellular communications channels from said third receive coverage area and wherein said third plurality of receive cellular communications channels includes the common receive cellular communications channel from the mobile station;
   a third channel splitter operatively connected to said third wideband receiver for separating said third plurality of receive channels; and
   wherein said diversity combiner is operatively connected to said first, second, and third channel splitters for combining said common receiver cellular communications channel from said first, second, and third channel splitters to produce an enhanced quality output receive channel from the mobile station.

6. A base station according to claim 1 wherein said first wideband receiver receives said first plurality of receive cellular communications channels operating on consecutive predetermined cellular frequencies ranging from $f_1$ to $f_n$, and wherein said second wideband receiver receives said second plurality of receive cellular communications channels operating on consecutive predetermined cellular frequencies ranging from $f_2$ to $f_{n+1}$.

7. A cellular base station for communicating with a mobile station in a cellular communications system over one of a plurality of cellular communications channels, said base station comprising:
   a plurality of receive antennas for receiving signals from the mobile station over the cellular communications channel wherein each receive antenna is oriented to define a respective receive coverage area:
   a support structure for supporting said plurality of receive antennas so that a first receive antenna defines a first receive coverage area and a second receive antenna defines a second receive coverage area overlapping a portion of said first receive coverage area;
   a first wideband receiver operatively connected to said first receive antenna, wherein said first wideband receiver receives a first plurality of receive cellular communications channels from said first receive coverage area;
   a second wideband receiver operatively connected to said second receive antenna, wherein said second wideband receiver receives a second plurality of receive cellular communications channels from said second receive coverage area and wherein said first and second pluralities of receive channels include the one common receive cellular communications channel from the mobile station;
   first and second channel splitters operatively connected to said respective first and second wideband receivers for separating said first and second pluralities of receive cellular communications channels; and
   a diversity combiner operatively connected to said first and second channel splitters for combining said common receive cellular communications channel from said first and second channel splitters to produce an enhanced quality output receive channel from the mobile station;
   wherein said first receive antenna receives signals having a first polarization and said second receive antenna receives signals having a second polarization different from said first polarization, and wherein said diversity combiner comprises a polarization diversity combiner; and
   wherein said first antenna defines a first transmit coverage area and transmits signals having said second polarization, and wherein said second antenna defines a second transmit coverage area and transmits signals having said first polarization.

8. A cellular base station for communicating with a mobile station in a cellular communications system over one of a plurality of cellular communications channels, said base station comprising:
   a plurality of receive antennas for receiving signals from the mobile station over the cellular communications channel wherein each receive antenna is oriented to define a respective receive coverage area;
   a support structure for supporting said plurality of receive antennas so that a first receive antenna defines a first receive coverage area, a second receive antenna adjacent said first receive antenna defines a second receive coverage area overlapping a portion of said first receive coverage area, and a third receive antenna adjacent said second receive antenna defines a third receive coverage area overlapping portions of said first and second receive coverage areas;
   a first wideband receiver operatively connected to said first receive antenna, wherein said first wideband receiver receives a first plurality of receive cellular communications channels from said first receive coverage area;
   a second wideband receiver operatively connected to said second receive antenna, wherein said second wideband receiver receives a second plurality of receive cellular communications channels from said second receive coverage area;
   a third wideband receiver operatively connected to said third receive antenna, wherein said third wideband receiver receives a third plurality of receive cellular communications channels from said third receive coverage area and wherein said first, second, and third pluralities of receive channels include the common receive cellular communications channel from the mobile station;
   first, second, and third channel splitters operatively connected to said respective first, second, and third wideband receivers for separating said first, second, and third pluralities of receive channels; and
   a diversity combiner operatively connected to said first, second, and third channel splitters for combining said common receive cellular communications channel from said first, second, and third channel splitters to produce an enhanced quality output receive channel from the mobile station;

wherein said first and third receive antennas receive signals having a first polarization and said second receive antenna receives signals having a second polarization different from said first polarization, and wherein said diversity combiner comprises a polarization diversity combiner;

wherein said first and third antennas define respective first and third transmit coverage areas and transmit signals having said second polarization, and wherein said second antenna defines a second transmit coverage area and transmits signals having said first polarization.

9. A cellular base station for communicating with a mobile station in a cellular communications system over one of a plurality of cellular communications channels, said base station comprising:

a plurality of receive antennas for receiving signals from the mobile station over the cellular communications channel wherein each receive antenna is oriented to define a respective receive coverage area;

a support structure for supporting said plurality of receive antennas so that a first receive antenna defines a first receive coverage area, a second receive antenna adjacent said first receive antenna defines a second receive coverage area overlapping a portion of said first receive coverage area, and a third receive antenna adjacent said second receive antenna defines a third receive coverage area overlapping portions of said first and second receive coverage areas;

a first wideband receiver operatively connected to said first receive antenna, wherein said first wideband receiver receives a first plurality of receive cellular communications channels from said first receive coverage area;

a second wideband receiver operatively connected to said second receive antenna, wherein said second wideband receiver receives a second plurality of receive cellular communications channels from said second receive coverage area;

a third wideband receiver operatively connected to said third receive antenna, wherein said third wideband receiver receives a third plurality of receive cellular communications channels from said third receive coverage area and wherein said first, second, and third pluralities of receive channels include the common receive cellular communications channel from the mobile station;

first, second, and third channel splitters operatively connected to said respective first, second, and third wideband receivers for separating said first, second, and third pluralities of receive channels; and a diversity combiner operatively connected to said first, second, and third channel splitters for combining said common receive cellular communications channel from said first, second, and third channel splitters to produce an enhanced quality output receive channel from the mobile station;

wherein each of said receive channels operates on a predetermined frequency and said first, second, and third pluralities of receive channels each comprise receive channels operating on consecutive frequencies.

10. A base station according to claim 9 wherein first and third receive antennas receive signals having a first polarization and said second receive antenna receives signals having a second polarization different from said first polarization, and wherein said diversity combiner comprises a polarization diversity combiner.

11. A base station according to claim 10 wherein said first polarization comprises right-hand-circular polarization and said second polarization comprises left-hand-circular polarization.

12. A base station according to claim 9 wherein said first wideband receiver receives said first plurality of receive cellular communications channels operating on consecutive predetermined cellular frequencies ranging from $f_1$ to $f_n$, wherein said second wideband receiver receives said second plurality of receive cellular communications channels operating on consecutive predetermined cellular frequencies ranging from $f_2$ to $f_{n+1}$, and wherein said third wideband receiver receives said third plurality of receive cellular communications channels operating on consecutive predetermined cellular frequencies ranging from $f_3$ to $f_{n+2}$.

13. A method for communicating with a mobile station over one of a plurality of cellular communications channels, said method comprising the steps of:

receiving a first plurality of receive cellular communications channels from a first receive coverage area;

receiving a second plurality of receive cellular communications channels from a second receive coverage area which overlaps a portion of said first receive coverage area, wherein said first and second pluralities of receive cellular communications channels include the common receive cellular communications channel from the mobile station;

separating said common receive channel from each of said first and second pluralities of receive cellular communications channels;

combining said common receive cellular communications channel from said first and second receive coverage areas to produce an enhanced quality output receive channel from the mobile station, wherein said step of receiving said first plurality of receive channels comprises receiving said first plurality of receive channels having a first polarization, and wherein said step of receiving said second plurality of receive channels comprises receiving said second plurality of receive channels having a second polarization different from said first polarization;

transmitting signals having said second polarization into said first receive coverage area; and transmitting signals having said first polarization into said second receive coverage area.

14. A method for communicating with a mobile station over one of a plurality of cellular communications channels, said method comprising the steps of:

receiving a first plurality of receive cellular communications channels from a first receive coverage area;

receiving a second plurality of receive cellular communications channels from a second receive coverage area which overlaps a portion of said first receive coverage area, wherein said first and second pluralities of receive cellular communications channels include the common receive cellular communications channel from the mobile station;

separating said common receive channel from each of said first and second pluralities of receive cellular communications channels; and combining said common receive cellular communications channel from said first and second receive coverage areas to produce an enhanced quality output receive channel from the mobile station;

wherein each of said receive cellular communications channels operates on a predetermined frequency and said first and second pluralities of receive cellular communications channels each comprise receive cellular communications channels operating on consecutive predetermined frequencies.

15. A method according to claim 14 wherein said step of receiving said first plurality of receive channels comprises receiving said first plurality of receive channels having a first polarization, and wherein said step of receiving said second plurality of receive channels comprises receiving said second plurality of receive channels having a second polarization different from said first polarization.

16. A method according to claim 15 wherein said first polarization comprises right-hand-circular polarization and said second polarization comprises left-hand-circular polarization.

17. A method according to claim 14 further comprising the steps of:

receiving a third plurality of receive cellular communications channels from a third receive coverage area which overlaps portions of said first and second receive coverage areas, and wherein said third plurality of receive cellular communications includes said common receive cellular communications channel from the mobile station;

separating said third plurality of receive cellular communications channels; and wherein said combining step further comprises combining said common receive cellular communications channel from said first, second, and third channel splitters.

18. A method according to claim 14 wherein said first plurality of receive cellular communications channels operate on consecutive predetermined cellular frequencies ranging from $f_1$ to $f_n$, and wherein said second plurality of cellular communications channels operate on consecutive predetermined cellular frequencies ranging from $f_2$ to $ff_{n+1}$.

* * * * *